T. A. EDISON.
ROTARY KILN.
APPLICATION FILED OCT. 14, 1908.

996,070.

Patented June 27, 1911.

2 SHEETS—SHEET 1.

Witnesses:
Frank D. Lewis
Delos Holden

Inventor:
Thomas A Edison
by Frank L. Dyer
Atty.

Figure 1:
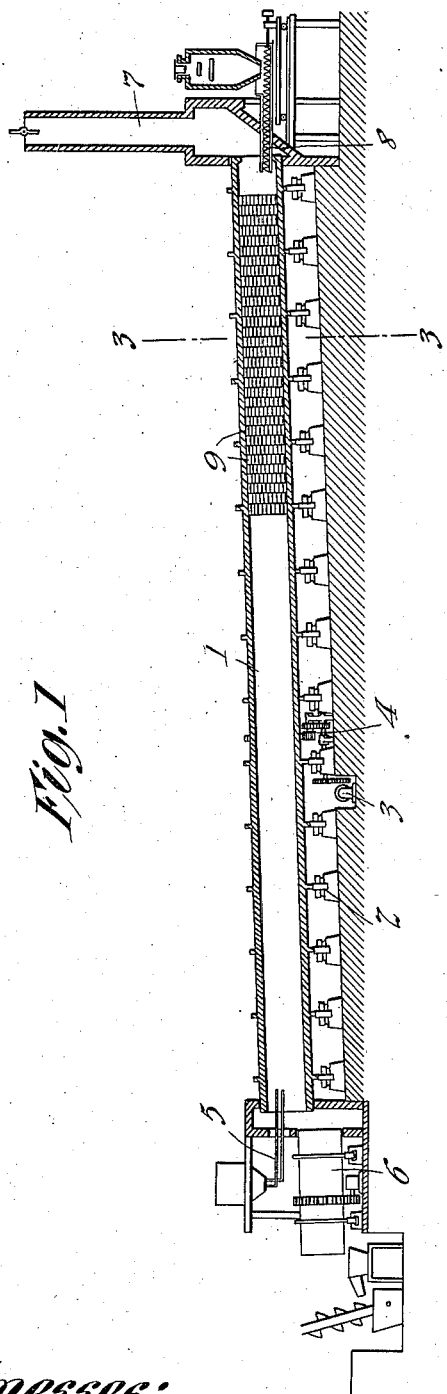

T. A. EDISON.
ROTARY KILN.
APPLICATION FILED OCT. 14, 1908.
996,070.
Patented June 27, 1911.
2 SHEETS—SHEET 2.
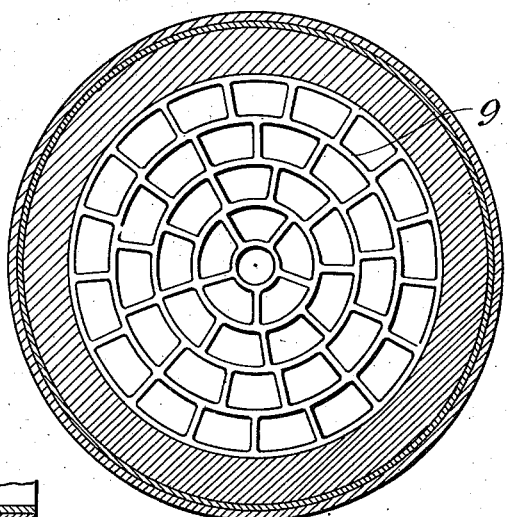
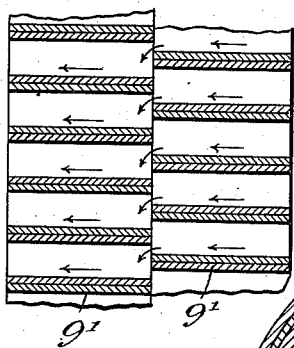
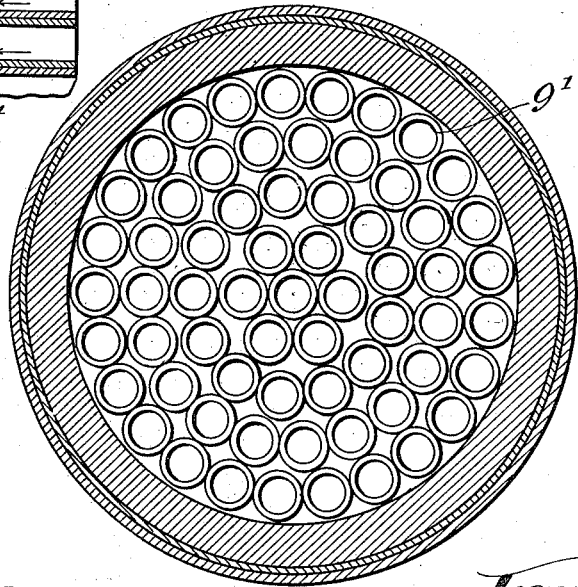

ized section on line 3—3 of Fig. 1; Fig. 4
UNITED STATES PATENT OFFICE.

THOMAS A. EDISON, OF LLEWELLYN PARK, ORANGE, NEW JERSEY.

ROTARY KILN.

996,070.  Specification of Letters Patent. Patented June 27, 1911.

Application filed October 14, 1908. Serial No. 457,591.

*To all whom it may concern:*

Be it known that I, THOMAS ALVA EDISON, a citizen of the United States, and a resident of Llewellyn Park, Orange, in the county of Essex and State of New Jersey, have invented certain new and useful Improvements in Rotary Kilns, of which the following is a specification.

My invention relates to rotary kilns adapted more particularly for the burning of Portland cement clinker, and has for its object the provision of means for increasing the efficiency of such kilns by abstracting a larger proportion of the heat from the gases and products of combustion passing through the kiln in contact with the incoming material, than has been heretofore possible.

In Patent No. 802,631, granted to me on October 24, 1905, I have disclosed and claimed an improved kiln of the rotary type for the burning of cement clinker, in which the cement material introduced at the upper end of the kiln travels for a long distance down the kiln in contact with the hot gases from the combustion zone of the kiln, the operation being such that the incoming material abstracts heat from the said gases, whereby it is completely calcined prior to entering the combustion zone and whereby the temperature of the said gases as they leave the kiln is lowered to or below a red heat or to 1000° Fahr. In the apparatus referred to the greater portion of the material lies on the bottom of the kiln and only the upper portion thereof is in contact with the heated gases, so that the exposed surface of said material is comparatively small.

According to the present invention I subdivide the incoming material by means of a large number of longitudinal partitions extending throughout the entire cross-sectional area of the upper end of the kiln, so that with a given load of material, the surface which contacts with the hot gases is greatly increased, whereby a greater proportion of heat will be extracted therefrom during their passage in contact with the said material, and a corresponding gain in efficiency of the process secured.

In order that the invention may be more clearly understood, reference is hereby made to the accompanying drawing in which—

Figure 2:
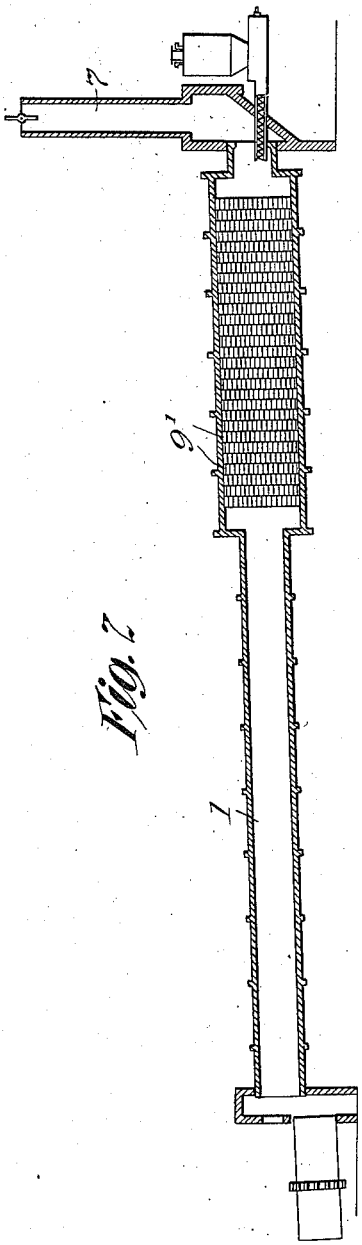

Figure 1 is a vertical longitudinal section of a cement kiln constructed in accordance with my invention; Fig. 2 is a similar view of a modified form of kiln; Fig. 3 is an enlarged section on line 3—3 of Fig. 1; Fig. 4 is a similar view on a slightly larger scale of a modified structure, and Fig. 5 is a greatly enlarged detail of a portion of Figs. 3 and 4.

The kiln shown in Fig. 1 is similar to that disclosed in the patent above referred to, and consists of a large number of cylindrical cast iron sections secured together at their ends, forming a long, tubular kiln or burner which is mounted in an inclined position upon supporting rollers 2, and is rotated by a motor 3 through gearing 4. The lower end of the kiln is provided with means 5 for supplying fuel to the combustion zone, and with a rotary cooler 6 for receiving the clinkered material. The upper end of the kiln opens into the stack 7 and is supplied with cement material by the conveyer 8, the parts thus described being fully disclosed in the said patent. The upper end of the kiln 1 is divided into a large number of longitudinal passages or channels by means of partitions 9 formed of refractory material such as fire brick. These partitions may be formed of sections, each of which fills the entire area of the kiln (see Fig. 3) and extends along the kiln for a short distance, a large number of such sections being placed end to end (see Fig. 1) and said sections may be placed with the passages thereof in staggered relation to each other as indicated in Fig. 5.

The same effect may be obtained by forming the longitudinal channels in the manner indicated in Fig. 4, in which a large number of tubes 9' are placed within the kiln so as to fill the cross-sectional area thereof, thus forming a section. These tubes are preferably short lengths, and each section of tubing is followed by successive sections, as indicated in Figs. 1 and 2. It is obvious that the incoming cement material will find its way into and through the large number of longitudinal passages or channels formed by the partitions 9 or 9', thus being greatly subdivided and presenting a large surface to the hot gases passing through the kiln.

In order to compensate for the decrease in the cross-sectional area available for the passage of the kiln gases, due to the partitions 9, the kiln may be made of increased diameter throughout the zone occupied by said partitions, as shown in Fig. 2. By this expedient the draft will be unimpaired and the sub-divison of the incoming material may be made even greater than in the structure of Fig. 1.

While I have described as the preferred type of kiln that which is disclosed in said Patent No. 802,631, the present invention is not limited in its application to kilns of the type referred to, but may be applied if desired, to the ordinary sixty-foot or other kilns.

Having now described my invention, what I claim is:

1. A cement kiln comprising an elongated tube and means for rotating the same, the lower end of said tube being adapted to contain a combustion zone, and the upper end of said tube being of increased internal cross-section and sub-divided into a multiplicity of longitudinal passages, substantially as set forth.

2. A cement kiln comprising an elongated tube and means for rotating the same, the lower end of said tube being adapted to contain a combustion zone, and the upper end of said tube being provided with a plurality of sections each of which consists of partitions forming longitudinal passages, said sections being so arranged that the passages of one section are out of alinement with the passages of the adjacent section, substantially as set forth.

This specification signed and witnessed this 10th day of October, 1908.

THOS. A. EDISON.

Witnesses:
DELOS HOLDEN,
FRANK D. LEWIS.